(12) United States Patent
Stevenson et al.

(10) Patent No.: US 6,493,020 B1
(45) Date of Patent: Dec. 10, 2002

(54) TELEVISION VIDEO PHONE

(75) Inventors: George E. Stevenson, Seattle, WA (US); Leslie Alan Leech, Kowloon (HK); James R. W. Phillips, Bellevue, WA (US); Dave J. Rye, New City, NY (US)

(73) Assignee: X10 Wireless Technology, Inc., Kent, WA (US)

( * ) Notice: Subject to any disclaimer, the term of this patent is extended or adjusted under 35 U.S.C. 154(b) by 0 days.

(21) Appl. No.: 09/587,379

(22) Filed: Jun. 1, 2000

(51) Int. Cl.[7] .................................................. H04N 7/14
(52) U.S. Cl. ................................. 348/14.04; 348/14.05; 348/14.01
(58) Field of Search .......................... 348/14.01, 14.02, 348/14.03, 14.04, 14.054, 14.06, 14.08, 14.09, 7.34; 455/419, 420; H04N 7/14

(56) References Cited

U.S. PATENT DOCUMENTS

| | | | |
|---|---|---|---|
| 5,227,780 A | * | 7/1993 | Tigwell ................. 340/825.72 |
| 5,900,867 A | * | 5/1999 | Schindler et al. ........... 348/734 |
| 5,999,207 A | * | 12/1999 | Rodriquez et al. ....... 348/14.04 |
| 6,061,339 A | * | 5/2000 | Nieczyporowicz et al. . 455/450 |
| 6,195,548 B1 | * | 12/2001 | Schultheiss ................. 455/419 |

FOREIGN PATENT DOCUMENTS

| | | | | |
|---|---|---|---|---|
| JP | 401284190 A | * | 11/1989 | ............ H04N/7/14 |

OTHER PUBLICATIONS

Schultheiss et al.; Method and System for providing television related services, Jul. 15, 1999, WO 99/35831.*

* cited by examiner

Primary Examiner—Melur Ramakrishnaiah
(74) Attorney, Agent, or Firm—Black Lowe & Graham PLLC

(57) ABSTRACT

A system and method for performing videophone operations over a television. The system includes a television system, a transceiver and a personal computer that is coupled to a communications network and the transceiver. The television system includes a camera, a microphone, a wireless receiver for wirelessly receiving audio and video signals, a signal processor for processing the received audio and video signals for presentation on a television. The transceiver includes a receiver for wirelessly receiving audio and video signals from the television system, and a transmitter for wirelessly sending audio and video signals to the television system. The personal computer includes a memory and a processor for executing program instructions stored in memory for receiving audio and video data over the communications network, for receiving audio and video data from the personal computer transceiver, and for sending the audio and video data received from the personal computer transceiver to a recipient system over the communications network.

19 Claims, 8 Drawing Sheets

```
                VIDEOPHONE LIST:
    110
     ↙         1. JOE A.
               2. JANE B.
               3. KEN L.
               4. MARY Z.
```

112 — *I.C.*

TELEVISION VIDEO PHONE

FIELD OF THE INVENTION

This invention relates to the art of videophones, and more particularly, a method and system for an improved videophone user interface.

BACKGROUND OF THE INVENTION

The concept of integrating video communication with audio communication traditionally provided by the telephone is old. Back in the 1960s a "picture phone" by which both audio and video were bidirectionally communicated between local and remote stations was introduced. These early picture phones added a television camera, a television transmitter and receiver, and a television monitor to the existing telephone assembly. In order to transceive (that is, both transmit and receive) audio and video, a dedicated high-capacity telephone line having a bandwidth adequate for bidirectional communication between the local and remote stations was required. In fact, a dedicated telephone line not generally available to the public, known as a T-3, was used. Hence, this picture phone was futuristic and considered cost prohibitive for widespread commercial deployment. Some time later, audio and video communication between local and remote stations appeared in the form of "video teleconferencing." Video teleconferencing systems typically require dedicated local and remote rooms. Generally, these video teleconferencing systems have evolved to comprise a video camera connected to a video processor which digitizes the video data, in turn connected to a communication controller for transmitting video over a high-capacity data communications link (a high-capacity digital telephone line, such as a T-1) leased from a common carrier. The video portion of the video teleconferencing system also comprises one or more television monitors connected to the video processor for displaying video. Recently, data compression techniques have been employed to render video transmission more efficient. For optimum audio quality and apparent synchronization between audio and video, audio is provided over another leased telephone line. Audio can be communicated over a standard telephone line, but audio quality is compromised (e.g., cross-talk, etc.). Also, synchronization between audio and video suffers not only because audio and video are being transceived by two different subsystems, but also due to propagation delay. Propagation delay is evident in visible loss of synchronization between audio and video, such as lip movement not synchronized with speech, especially if long distances are involved. In any event, audio and video are transceived over different telephone lines. Such video teleconferencing systems are commercially available from PictureTel Corporation of Peabody, Mass., and Compression Labs Inc. of San Jose, Calif., for example, but are priced at tens of thousands of dollars and are therefore affordable generally only by businesses, beyond the reach of the home consumer budget. Consequently, widespread deployment of these video teleconferencing systems has not occurred.

As an alternative to video teleconferencing, Matsushita Electric Ltd. introduced a still-image, black-and-white visual telephone in 1987. This visual telephone integrated a small video camera, video digitizer, communication controller, and cathode ray tube (CRT) display into a housing connected to either the same standard telephone line as the telephone assembly at each of the local and remote stations or to a second standard telephone line if the stations were equipped with two-line service. However, the system could not simultaneously exchange video snapshots between the local and remote stations, so the users at each end were required to coordinate video communication to avoid access conflicts. In any event, not only were audio and video non-simultaneous over the same telephone line, but only still video snapshots could be transceived, whereas true video teleconferencing provides motion video.

In recent years, a few Internet-based videophone systems, such as CU-Seeme, have appeared. These videophone systems require a user to have a camera and a personal computer (PC) coupled to the Internet. In order for the user to make or receive calls over the videophone system, the user must be located in the vicinity of the camera at the PC. Although this appears to be an attractive Internet-based application, it still requires the user to be located at the PC when making or receiving a call. Because most people place their PCs in separate rooms or in less frequently traveled locations in their house, it is inconvenient to make and receive calls, especially if they are not arranged in advance. Also, due to many people's fears of PCs, these systems are not attractive products to many consumer.

Therefore, there exists a need for making a more user-friendly videophone system. The present invention is directed to overcoming the foregoing and other disadvantages. More specifically, the present invention is directed to providing a system and method, for improving videophone interaction.

SUMMARY OF THE INVENTION

A system and method for using a television as a videophone is provided. The present invention allows a user to experience videophone functions on any television in their house.

The system includes a television system, a personal computer transceiver and a personal computer that is coupled to a communications network. The television system includes a camera, a microphone, a wireless receiver for wirelessly receiving audio and video signals, a signal processor for processing the received audio and video signals for presentation on a television. The personal computer transceiver includes a receiver for wirelessly receiving audio and video signals from the television system, and a transmitter for wirelessly sending audio and video signals to the television system. The personal computer, which is coupled to the personal computer transceiver, includes a memory and a processor coupled to the memory and in communication with the communications network and the transceiver. The memory includes stored program instructions that are executed by the processor for receiving audio and video data over the communications network, for receiving audio and video data from the personal computer transceiver, and for sending the audio and video data received from the personal computer transceiver to a recipient system over the communications network.

In accordance with a further aspect of the invention, the camera, the microphone and the transmitter are included in a stand-alone unit.

In accordance with a still further aspect of the invention, the system includes a remote control device for generating control signals. The remote control device includes an input device and a transmitter. The remote control device transmits control signals as UHF or infrared signals.

In accordance with another aspect of the invention, the input device of the remote control includes a microphone for including a voice command in the control signal. The processor component comprises a voice recognition component for processing voice commands included in a control signal.

In accordance with yet another aspect of the invention, the television system includes a second transmitter for wirelessly transmitting the control signal to the television, if it is determined that the control signal is for the television. The second wireless transmitter is an infrared transmitter.

In accordance with still yet another aspect of the invention, the processor component includes a decompression component for decompressing compressed audio and video data received over the communications network and a compression component for compressing the audio and video data received from the television system through the personal computer transceiver before sending over the communications network.

In accordance with still yet another aspect of the invention, the wireless communication between the television system and the transceiver is in the 2.3 and 2.5 GHz range.

In accordance with still yet another aspect of the invention, the audio and video data is streamed in real-time.

As will be readily appreciated from the foregoing summary, the invention provides a system and method for allowing a user to experience videophone functions on any television in their house.

BRIEF DESCRIPTION OF THE DRAWINGS

The preferred embodiment of this invention is discussed in detail below with reference to the following drawings.

DETAILED DESCRIPTION OF THE PREFERRED EMBODIMENT

Figure 1:
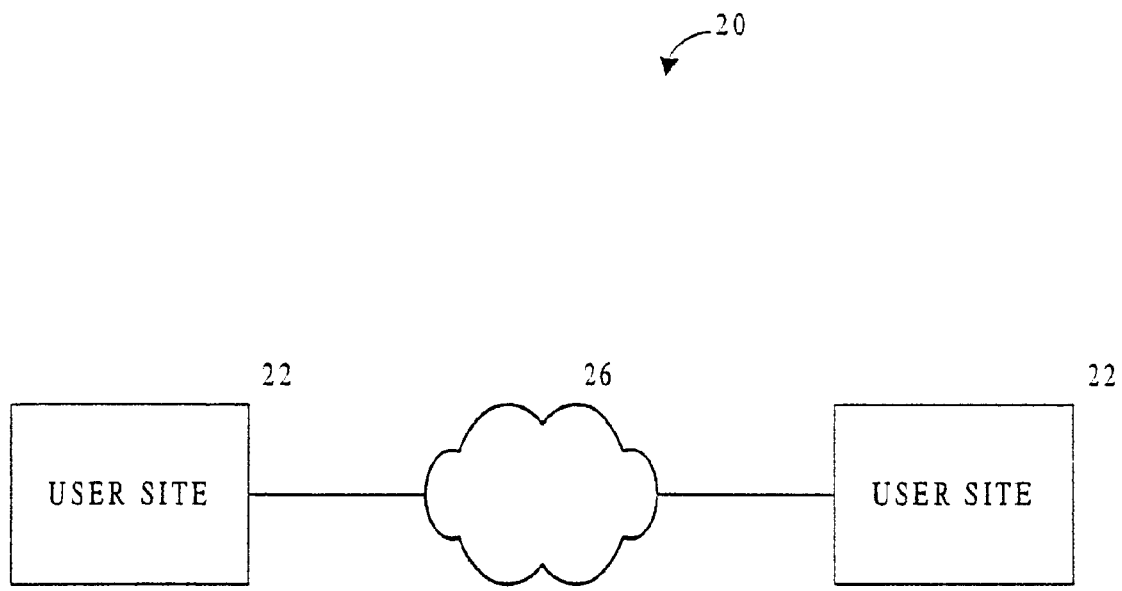
FIG. 1 illustrates a videophone system formed in accordance with the present invention.
Figure 2:
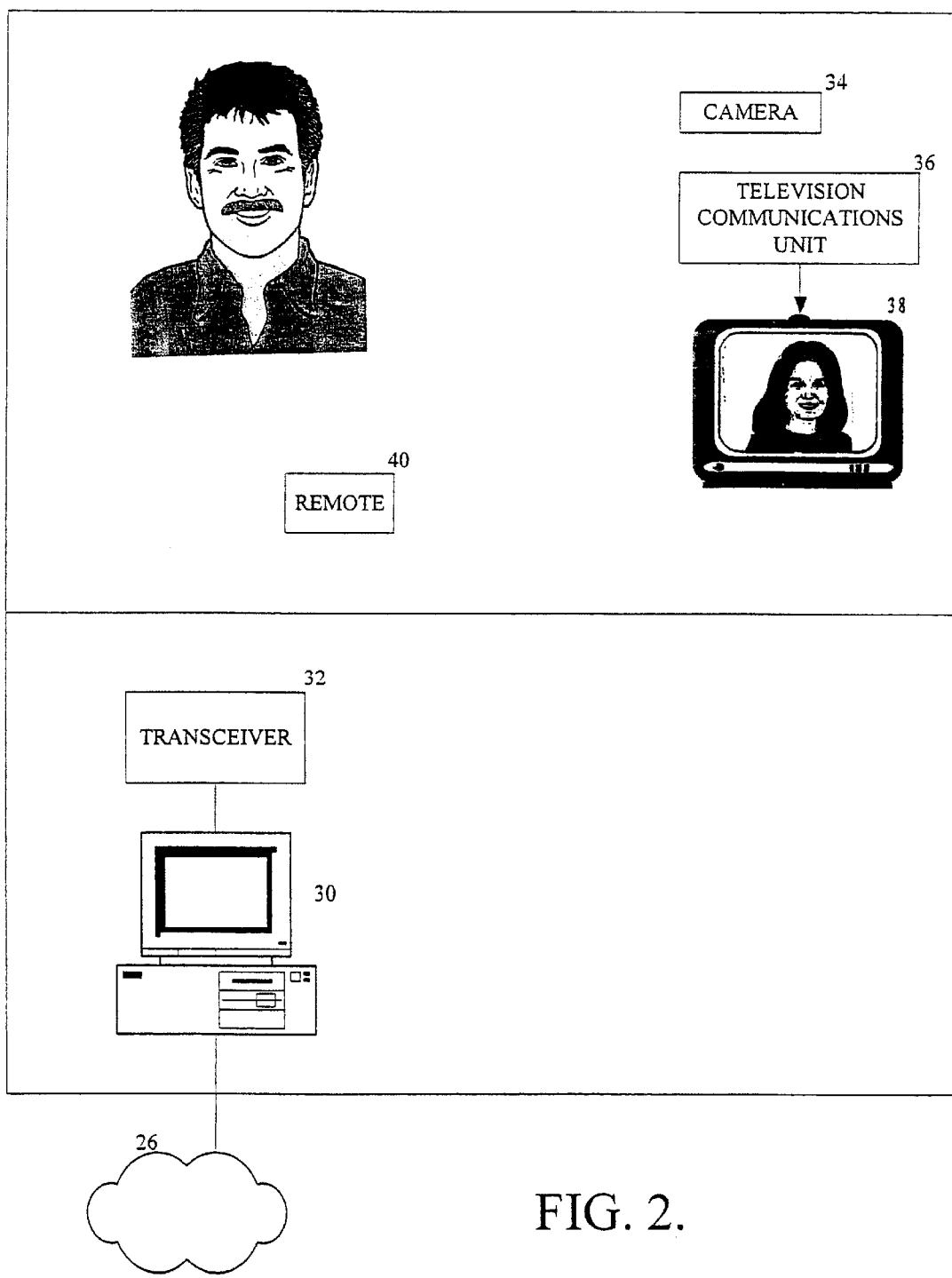
FIG. 2 illustrates a user site of the videophone system shown in FIG. 1.

The present invention provides a videophone system and method with an improved user interface. FIGS. 1 and 2 illustrate a system 20 that includes multiple user sites 22 coupled to a network 26. The network 26 is one of a public (e.g. Internet) or private data network. A first location 42 within a user site 22 includes a camera 34 and a television communication unit 36 that is coupled to a television 38 with speakers. The camera 34 and television communication unit 36 are described in more detail in FIGS. 4 and 5 below. Also included in the user site 22 is a remote control device 40 for controlling operation of the components of the site 22. The remote control device 40 is described in more detail in FIG. 6 below. A second location 44 within the user site 22 includes a transceiver 32 and a personal computer 30 coupled to the network 26 and the transceiver 32. The transceiver 32 receives audio and video signals from the camera 34 and transmits audio and video data received over the network 26 by the personal computer 30 to the television communication unit 36. The first and second locations 42 and 44 are either the same or different rooms at the user site 22. A site 22 is a area of a size acceptable for maintaining wireless communication between the transceiver 32 and the television communication unit 36 and the camera 34.

The transceiver 32, the television communication unit 36 and camera 34 transmit and receive audio and video signals wirelessly over designated channels. In one embodiment, the wireless communication is performed at the site 22 within a nominal 2.4 GHz two-channel communication range. For example, transceiver to unit transmission occurs on a 2.411 GHz channel and camera or television communication unit to transceiver transmission occurs on a 2.453 GHz channel. While 2.4 GHz or 900 MHz are preferred because they are standard wireless telephone frequencies in many countries, other frequencies and channels with acceptable strength and bandwidth can be used. Because the communication is wireless, any television with the aid of a television communication unit 36 and camera 34 can be coupled to a transceiver-aided personal computer and thus become a videophone.

Figure 3:
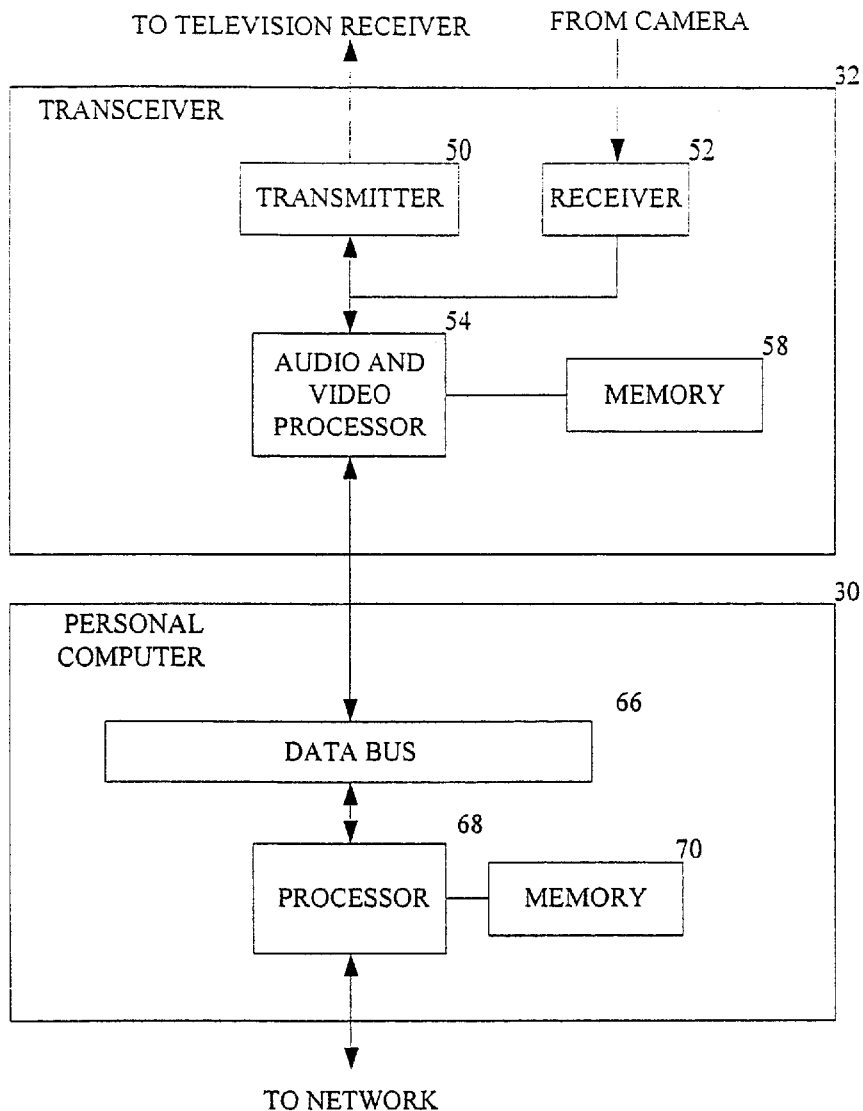
FIG. 3 illustrates a transceiver and personal computer of the videophone system.

As shown in FIG. 3, the transceiver 32 includes a transmitter 50, a receiver 52, memory 58, and an audio and video processor 54 coupled to the transmitter 50, the receiver 52, the memory 58, and the personal computer 30. The audio and video processor 54 includes hardware and software components for receiving and processing analog audio and video signals from the camera 34 and delivering the processed audio and video data to the personal computer 30. The audio and video processor 54 also includes hardware and software components for receiving and processing digital audio and video data from the personal computer 30 and transmitting the processed digital audio and video data to the television communication unit 36. Transceiver processes are described below in more detail with respect to FIGS. 11 and 12

Still referring to FIG. 3, the personal computer 30 includes a data bus 66 coupled to the transceiver 32, and a processor 68 coupled to the data bus 66, a memory 70 and the network 26. Preferably, the data bus 66 is a Universal Serial Bus (USB) with its bandwidth split between sending data and receiving data. Other high-speed data buses may be used. The processor 68 executes a videophone application program stored in the memory 70 for performing system functions, such as making a videophone call, receiving a videophone call, processing the audio and video data sent to and received from the network 26 and generating a graphical or other user interface. The processing of the sent and received audio and video data is performed in a "streaming media" manner. In other words, the personal computer 30 does not wait to download a large audio and video file before processing the audio and video data. Instead, the media, audio and video, is sent in a continuous stream and is processed, sent to the television and presented at the television as it arrives. Some example streaming media programs are RealSystem G2 from RealNetwork, Microsoft Windows Media Technologies (NetShow Services and Theater Server), and VDO. In order for the media to be streaming, it is compressed for delivery over the network 26 and decompressed when received by the personal computer 30. Compression and decompression of streaming multimedia is performed at anyone of the components at a site 22 (the personal computer 30, the transceiver 32 or any of the other components at the site 22). The streaming media programs use compression/decompression algorithms; for example, the standard MPEG-4 compression algorithm or, alternatively, a proprietary algorithm. The application program also includes a voice recognition component for performing voice recognition processing of voice commands included in control signals sent by the remote control device 40. Remote control functions are described in more detail below in FIG. 6. The voice recognition component activates functions of the videophone application program based on the processed voice commands. Personal computer processes are described below in more detail with respect to FIGS. 11 and 12.

Figure 4:
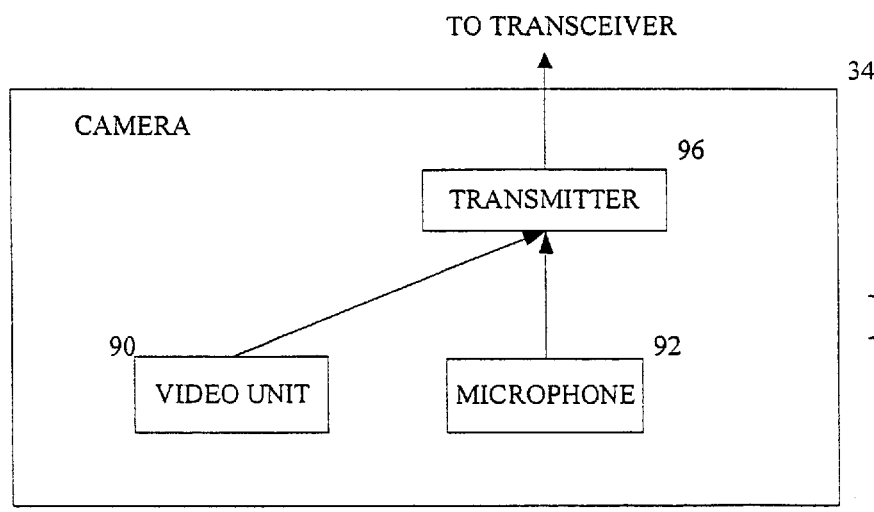
FIG. 4 illustrates a camera used in the videophone system.

As shown in FIG. 4, the camera 34 includes a video unit 90 for capturing video images as video signal, a microphone 92 for capturing sound as audio signal, and a transmitter 96 for transmitting the captured audio and video signals to the transceiver 32.

Figure 5:
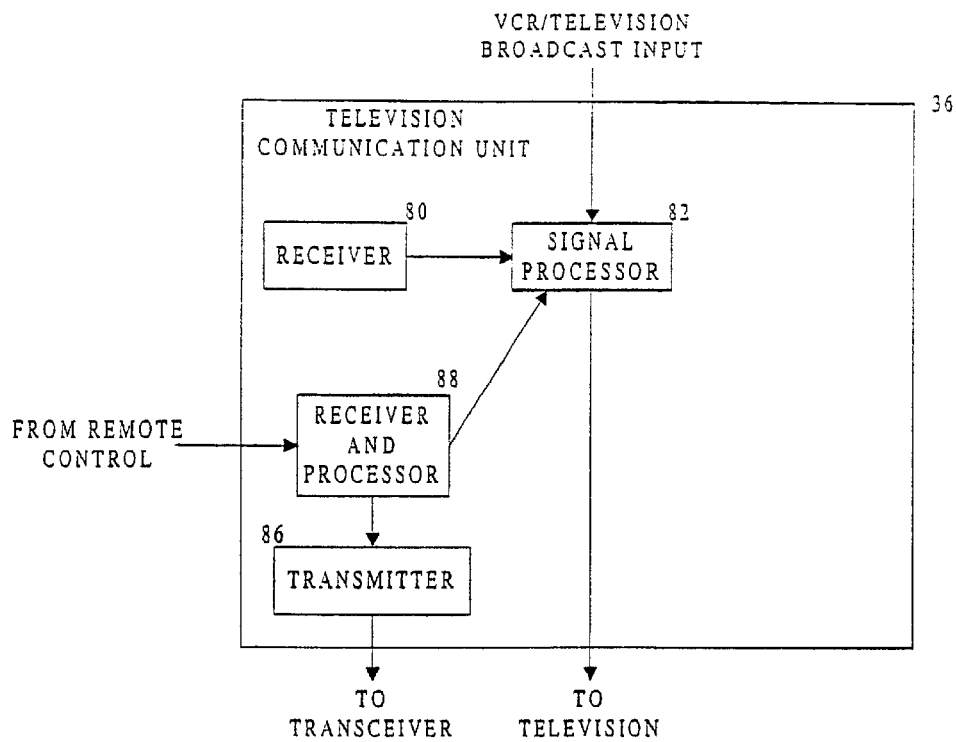
FIG. 5 illustrates a television communication unit used in the videophone system.

As shown in FIG. 5, the television communication unit 36 includes an audio and video signals receiver 80, a control signal receiver and processor 88, and a transmitter 86, all coupled to a signal processor 82. The audio and video signals receiver 80 receives audio and video signals, as well as control signals for presenting user interface functions, from the transceiver 32. The signal processor 82 processes the received audio and video signals for presentation and sends the processed audio and video signals to the television 38 for presentation. The signal processor 82 also receives a television broadcast input directly, such as a directly connected cable or satellite feed, or through a broadcast receiving device, a VCR or other similar device. The signal processor 82 includes a display processing component for displaying video received from receiver 80 on the television 38 concurrently with a television broadcast, adjacent to a television broadcast, in place of a television broadcast or in a picture-in-picture format. The user selects the display format from a graphical user interface generated by the unit 36 or sent from the personal computer 30 through the transceiver 32 using the remote control device 40. The control signal receiver and processor 88 receives control signals from the remote control device 40 and determines whether they are television control signals or videophone control signals. If the control signals are videophone control signals the transmitter 86 sends videophone control signals to the transceiver 32. Television control signals are executed by the processor 88 and the display processing component.

Figure 6:
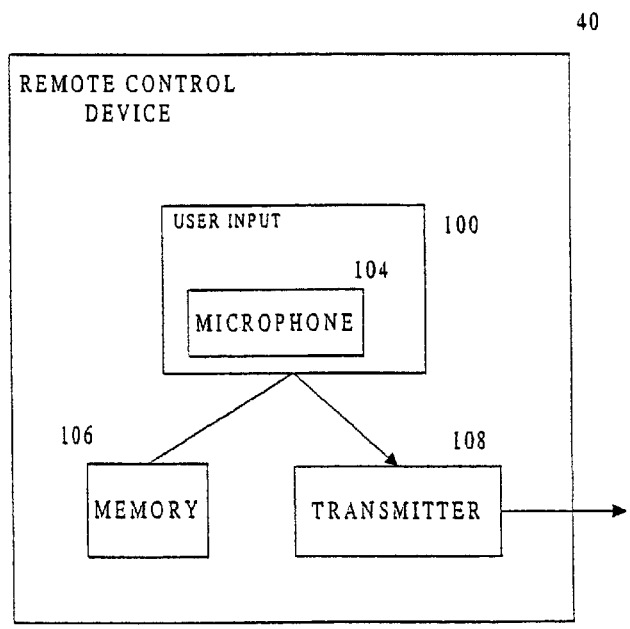
FIG. 6 illustrates a remote control device used in the videophone system.

FIG. 6 illustrates components of the remote control device 40. The remote control device 40 includes a user input device 100 and a transmission code memory 106 both of which are coupled to a transmitter 108. The user input device 100 includes a keypad with numbered and function designated keys and a microphone 104. The transmission code memory 106 stores transmission codes for various remotely controlled devices, such as the television 38, the television communication unit 36, the transceiver 32 and other remotely controllable electronic devices. The transmitter 108 and any corresponding receiver on another device perform UHF, infrared, or another known acceptable form of wireless communication. The user input device 100 also includes a mode switch that allows a user to select the device's mode of operation (television mode, television communication unit mode, transceiver mode, or other device mode). When the user activates the input device 100 by selecting keys and/or talking into the microphone 104, a control signal is transmitted over the transmitter 108. In the television mode, a user activation of the user input device 100 sends control signals to the television 38 from the transmitter 108 according to the television's transmission code that is stored in the transmission code memory 106. In the television receiver unit mode, the user input device 100 allows the user to send control signals from the transmitter 108 to the control signal receiver and processor 88 of the television communication unit 36 according to the television communication unit's transmission code stored in the memory 106. The control signals sent to the television communication unit 36 allow the user to control videophone functions and the format of images displayed on the television and television channel selection. Remote control processes are described below in more detail with respect to FIGS. 11 and 12. The controlling functions available through the remote control 40 are also included in the television communication unit 36.

Figure 7:
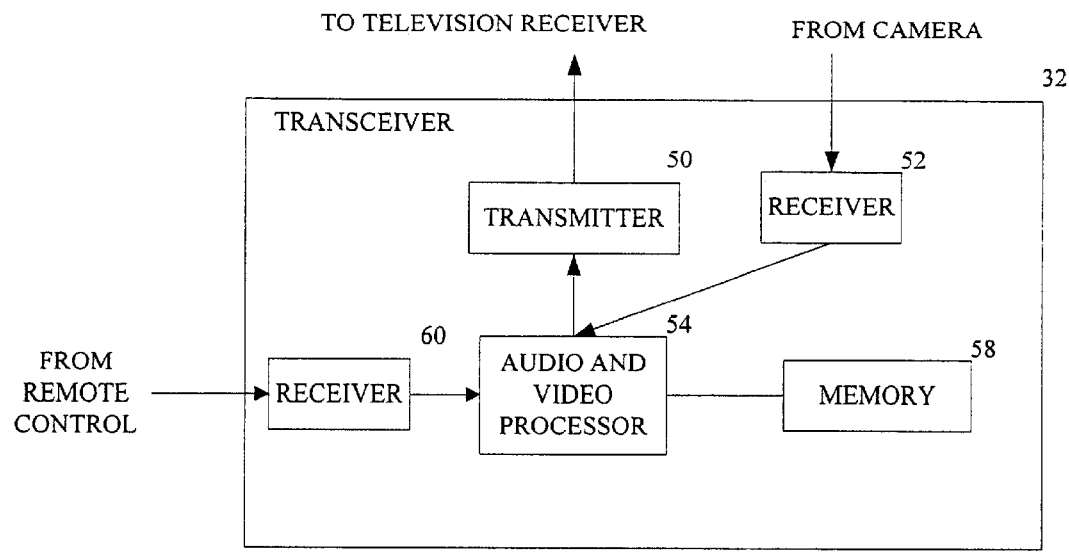
FIGS. 7 and 8 illustrate an alternate embodiment of the transceiver and the television communication unit used in the videophone system.
Figure 8:
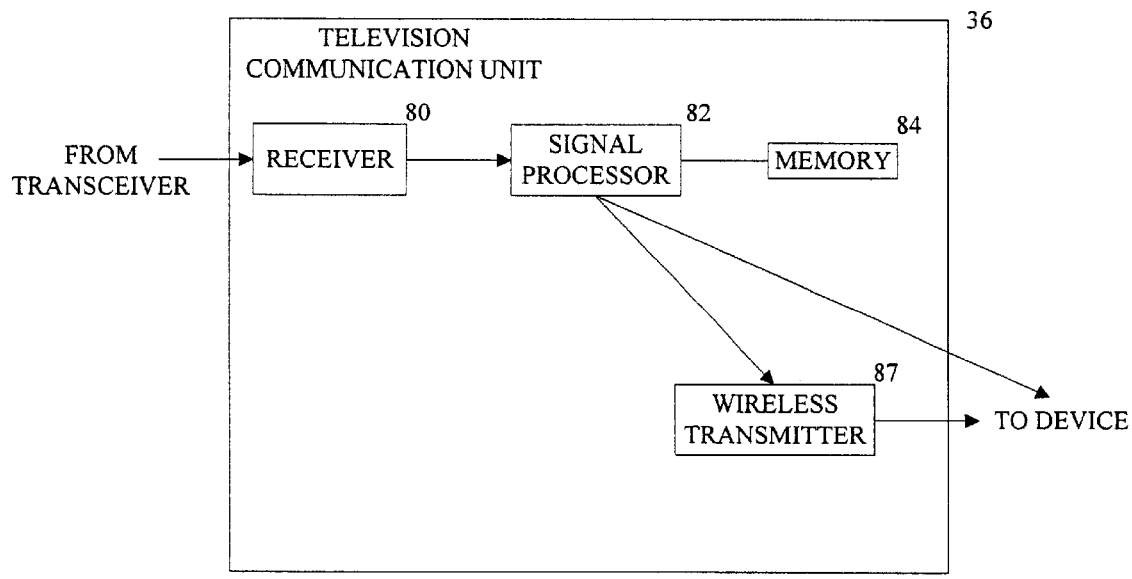

In an alternate embodiment shown in FIGS. 7 and 8, the transceiver 32 includes a control signals receiver 60 compatible for receiving control signals from the remote control device 40. Also, the television communication unit 36 includes a memory 84, a wireless transmitter 87 and does not include the control signal receiver and processor 88. The memory 84 stores transmission codes. Control signals from the remote control device 40 are received by the transceiver's control signals receiver 60. If the transceiver 32 determines that the received control signals are television broadcast control signals, they are sent via the transmitter 50 to the television communication unit's receiver 80. The television broadcast control signals include the corresponding transmission code retrieved from the memory 84, if a wireless transmission is required by the television communication unit 36. Then, the television communication unit 36 executes the control signals or transmits the control signals via a wire connection or the wireless transmitter 87 to the appropriate device as determined by a transmission code accompanying the control signal. The wireless transmitter 87 communicates with UHF, IR or another acceptable form of wireless communication.

In another embodiment, the personal computer 30 includes an audio feedback cancellation component for eliminating feedback that can occur between the television's speakers and the microphone 92 of the camera 34. The sound feedback cancellation component records the audio that it sends to the television communication unit 36 and identifies the delay time between transmission and reception for the audio data. Then, the sound feedback cancellation component delays the recorded audio and subtracts the properly amplified transmission signal from the audio that is received by the microphone 92.

Figures 9, 10:
FIGS. 9 and 10 are a screen shot diagrams of an example graphical user interfaces formed in accordance with the present invention.
Figure 11:
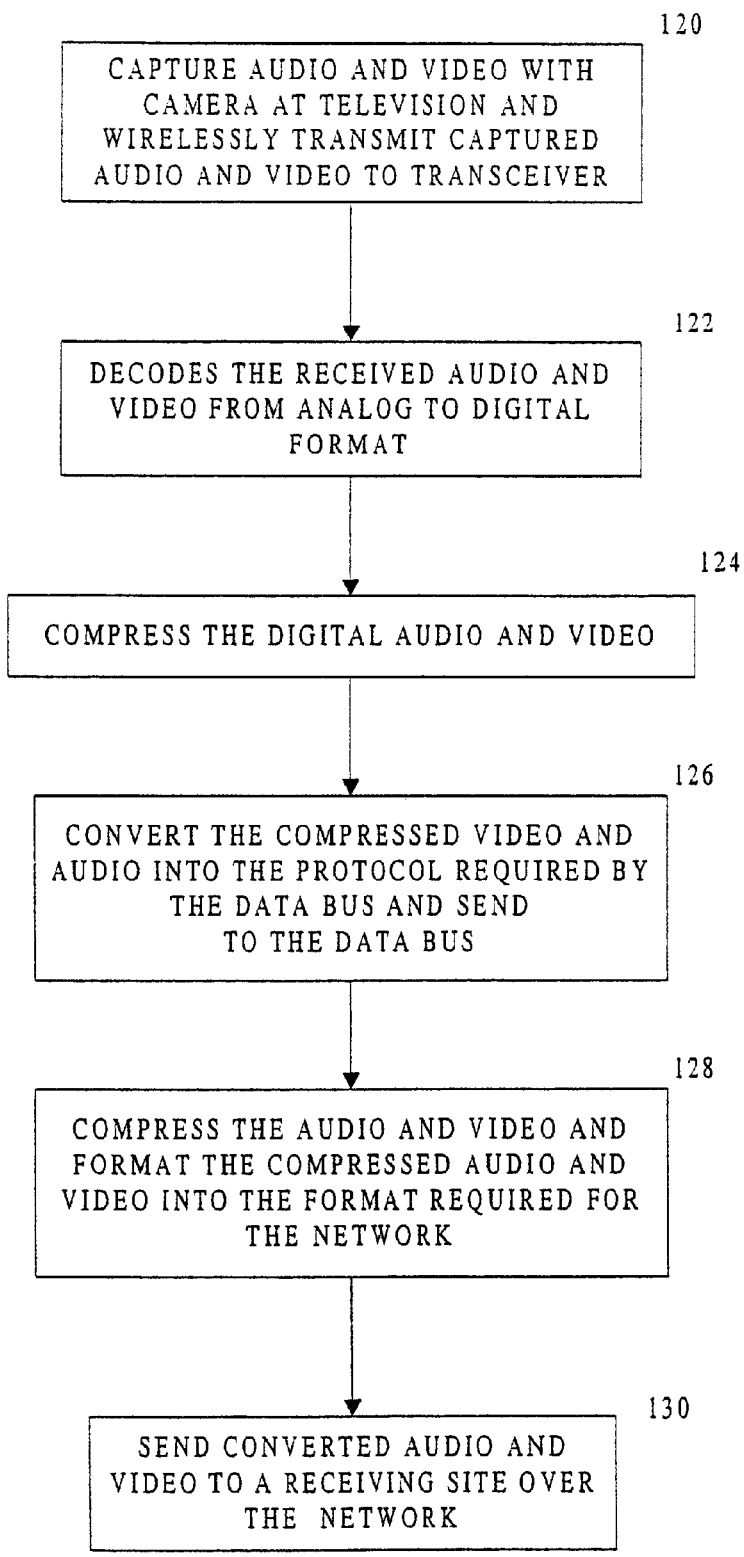
FIGS. 11 and 12 illustrate a process for operating the system of FIGS. 1–6.
Figure 12:
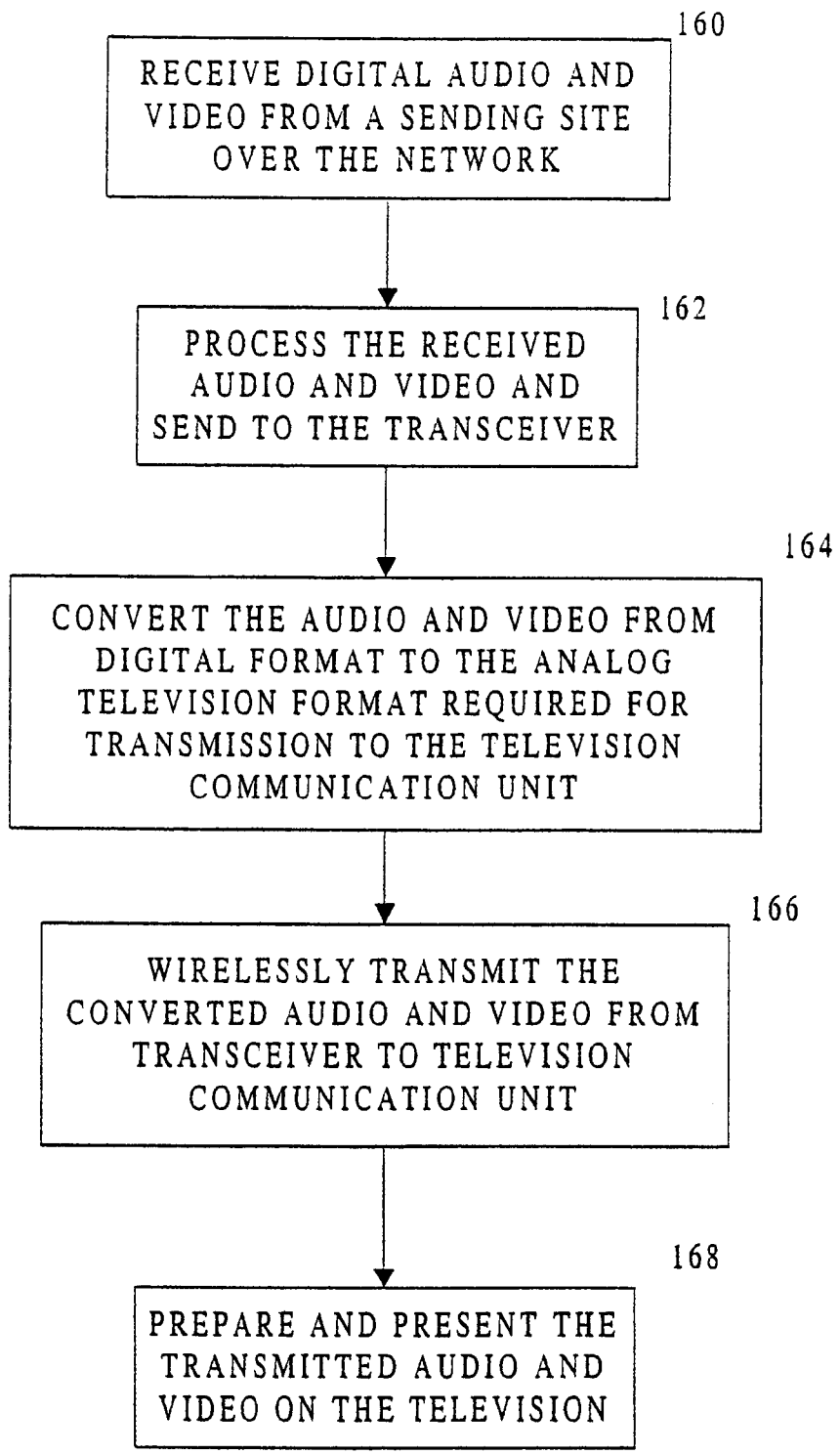

FIGS. 11 and 12 illustrate delivery and reception of audio and video data from the components in a first user site to the components in a second user site as shown in FIGS. 1–6. Before a videophone communication occurs, a videophone call is initiated by a user. The user activates a make call button within the user input device 100 or a make call command user interface displayed on the television 38, or gives a make call voice command to the microphone 104 to generate a control signal with a command to make a call. The remote control device 40 sends the generated control signal to the control signal receiver and processor 88 (or the transceiver 32 see alternate embodiment above). The control signal receiver and processor 88 then sends the control signal to the transceiver 32 via the transmitter 86. The transceiver 32 converts the control signal from its transmitted format into the digital protocol required by the data bus 66 and then sends the converted control signal to the personal computer 30 on the data bus 66. The personal computer processor 68 responds to the received control signal by establishing a connection with the network 26, if one does not already exist, and sending a graphical user interface to the transceiver 32, if one has not already been sent. The transceiver 32 converts the graphical user interface for transmission and sends the converted graphical user interface to the television communication unit 36. The signal processor 82 presents the graphical user interface for display on the television 38. The presentation of the graphical user interface is displayed concurrently with the presently displayed video, in place of the presently displayed video, adjacent to the presently displayed video or in a picture-in-picture view. The graphical user interface provides selections of phone numbers, names or addresses of users that have videophone systems. FIG. 9 is an example graphical user interface that includes a list of videophone recipients 110. With the user input device 100 the user selects a recipient by controlling and activating a displayed cursor relative to the desired recipient or by selecting the number on the keypad of the remote control device 40 that corresponds to the desired recipient. Also, the user selects a desired recipient by saying the recipients name or corresponding number into the microphone 104. The user's selection generates another control signal that is sent to the personal computer in the same manner as described above. The processor 68 by direction from the control signal sends a call request message to the site 22 of the selected recipient as determined by the memory 70 that includes network address information associated with the recipients. Control signals with voice commands are processed by the voice recognition component as described above.

The personal computer 30 at the destination site, while connected to the network 26, receives a message from the site sending the call request message. The destination personal computer 30 determines the user who initiated the call according to information included in the call request message or according to a comparison of address information included in the call request message to other user information stored in the memory 70. Then, the destination personal computer 30 generates and sends an incoming call control signal that includes the identity of the call initiator to the television communication unit 36 via the transceiver 32. As shown in FIG. 10, if the television is on, the television communication unit 36 presents an incoming call (IC) icon 112 on the television 38, or sounds an audible signal, such as a phone ring, over the television 38 in accordance with the received incoming call control signal. In one embodiment, the identity of the call initiator is presented to the recipient according to the call control signal. For example, the presented icon is the name of the call initiator or the audible signal is voice saying the name of the call initiator. The recipient then activates a receive call button within the user input device 100 or the icon 112 displayed on the television 38, or gives a receive call voice command to the microphone 104 to generate and send a control signal with a command to receive the incoming call. When the personal computer 30 receives the control signal with the command to receive the incoming call, the personal computer 30 establishes bi directional audio and video communication and the processes described below in FIGS. 11 and 12 occur simultaneously at both sites. A connection could also be made automatically for the purpose of recording who called.

As shown in FIG. 11, at block 120, audio and video are captured by the camera 38 in one of a number of standard analog television formats, such as NTSC, PAL or comparable format. The captured audio and video is wirelessly transmitted by the camera's transmitter 96 to the transceiver's receiver 52. Next, at block 122, the audio and video processor 54 decodes television format audio and video signal. Then, at block 124, the decoded audio portion is compressed by a known compression algorithm. The compressed audio and the decoded video are converted to the protocol required by the personal computer's data bus 66, see block 126, and then sent to the personal computer 30. The audio and video processor 54 performs buffering as necessary with the memory 58 in order to the stream the audio and video data. The personal computer 30 compresses the converted audio and video data and formats the compressed audio and video data for streaming to a receiving site over the network 26, see block 128. At block 130, the personal computer 30 sends the formatted audio and video data to receiving site over the network 26 in accordance with address information included in a received videophone call or as determined during call initiation.

FIG. 12 illustrates the process of receiving a videophone transmission at a user site 22. First, at block 160, the personal computer 30 receives digital audio and video data from a sending site over the network 26. Next, at block 162, the processor 68 converts the received digital audio and video data into the protocol required by the data bus 66 and sends the converted digital audio and video data to the transceiver 32 via the data bus 66. Next, at block 164, the audio video processor 54 converts the digital audio and video data into analog television format audio and video signals required for transmission to the television communication unit 36. At block 166, the analog audio and video signals are wirelessly transmitted to the television communication unit 36 from the transceiver 32. Then, at block 168, the signal processor 82 prepares and sends the analog audio and video signals to the television 38 for presentation to the user.

In an alternate embodiment, the videophone application program allows a user at a first site to select from video images generated by one of many cameras at another site. Also, the videophone application program allows a user to control the audio and video captured at that user's site; for example, muting the sound, stopping the video being transmitted from the user's personal computer, or selecting the camera used to generate audio and video signals for transmission to a recipient.

While the preferred embodiment of the invention has been illustrated and described, it will be appreciated that various changes can be made without departing from the spirit and scope of the invention.

The embodiments of the invention in which an exclusive property or privilege is claimed are defined as follows:

1. A videophone system in communication with a communications network for presenting a videophone interface on a television, the system comprising:
    a remote control device comprising:
        an input device for receiving user selections based upon which the remote control device generates a control signal, the control signal including at least one of:
            a television control signal, and
            a videophone control signal;
        an infrared transmitter for wirelessly transmitting the control signal;
    a television system comprising:
        a camera;
        a microphone;
        a receiver for wirelessly receiving audio and video signals;

an infrared receiver and processor for receiving the control signal from the infrared transmitter of the remote and determining if the control signal is a videophone control signal;

a control signal transmitter coupled to the infrared receiver and processor for retransmitting the control signal, if the control signal is a videophone control signal;

a signal processor for preparing the received audio and video signals for presentation on the television and sending the prepared audio and video signals to the television; and a transmitter coupled to the camera and microphone for wirelessly transmitting audio and video signals;

a personal computer transceiver comprising:
a receiver for wirelessly receiving the videophone control signal and the audio and video signals from the television system; and
a transmitter for wirelessly sending audio and video signals to the television system;

a personal computer coupled to the personal computer transceiver, the personal computer comprising:
a memory;
a processor coupled to the memory and in communication with the communications network and the transceiver; and
wherein the memory includes stored program instructions to be executed by the processor for receiving audio and video data over the communications network, for receiving audio and video data from the personal computer transceiver, and for sending the audio and video data received from the personal computer transceiver to a recipient system over the communications network.

2. The system of claim 1, wherein the camera, the microphone, the transmitter and the infrared transmitter and processor are comprised in a unit.

3. The system of claim 1, wherein the television system's receiver and transmitter and the transceiver's transmitter and receiver perform wireless communication between 2.3 and 2.5 GHz.

4. The system of claim 1, wherein the input device of the remote control comprises a microphone for recording a voice command and wherein the generated control signal comprises the recorded voice command.

5. The system of claim 4, wherein the processor component comprises a voice recognition component for determining a function command based on the voice command comprised in the control signal.

6. The system of claim 1, wherein the processor component further comprises:
a decompression component for decompressing compressed audio and video data received over the communications network; and
a compression component for compressing the audio and video data received from the television system through the personal computer transceiver before sending over the communications network.

7. The system of claim 1, wherein processing and communication of audio and video data is performed in real-time.

8. The system of claim 1, wherein processing and communication of audio and video data is streamed.

9. The system of claim 1, wherein the television system further comprises a control interface for allowing a user to control system functions.

10. The system of claim 1, wherein the television has a television control signal receiver that receives the television control directly from the remote control device.

11. A method for providing videophone service using a videophone interface on a television, the method comprising:
generating a control signal according to user activation of a remote control device;
wirelessly transmitting by infrared the generated control signal from the remote control device to a receiver coupled to the television;
determining at the receiver coupled to the television if the control signal should be transmitted to a transceiver coupled to a personal computer;
controlling the videophone interface according to the transmitted control signal;
wirelessly sending audio and video signals from a transmitter coupled to a camera and a microphone to a transceiver coupled to a personal computer;
sending the audio and video signals received by the transceiver from the transmitter to the personal computer coupled to a communications network;
processing the sent audio and video signals;
sending the processed audio and video signals from the personal computer to a recipient system over the communications network.

12. The method of claim 11, wherein the wireless transmission and reception is between 2.3 and 2.5 GHz.

13. The method of claim 11, further comprising:
including a voice command in the control signal; and
controlling the videophone interface according to the included voice command.

14. The method of claim 11, further comprising:
decompressing compressed audio and video data received over the communications network; and
compressing the audio and video data received from the television system through the transceiver before sending over the communications network.

15. The method of claim 11, wherein audio and video images are wirelessly sent to the transceiver of the personal computer from a plurality of cameras and microphones and the further selects the audio and video images for sending the processed audio and video signals from the personal computer to a recipient system over the communications network.

16. The method of claim 11, wherein the processing of the audio and video data includes an audio feedback cancellation method, the audio feedback cancellation method comprising:
recording an audio signal sent from the transceiver coupled to the personal computer;
identifying a delay period that represents the time between when the audio signal is sent from the transceiver coupled to the personal computer and when the microphone receives the audio signal from a television speaker;
waiting an period substantially equal to the delay period; and
subtracting the recorded audio signal from an audio signal transmitted from the microphone to the transceiver coupled to the personal computer.

17. The method of claim 11, wherein the processed audio and video data includes a graphical user interface responsive to the control signals generated by the remote control.

18. The method of claim 11, wherein the graphical user interface comprises a call directory.

19. The method of claim 11, wherein the graphical user interface appears in a picture-in-picture window on the television.

* * * * *